(12) United States Patent
Baek et al.

(10) Patent No.: US 9,703,020 B2
(45) Date of Patent: Jul. 11, 2017

(54) BROADBAND LIGHT ABSORBER AND DISPLAY APPARATUS INCLUDING THE SAME

(71) Applicants: Samsung Display Co., Ltd., Yongin (KR); KOREA UNIVERSITY Research and Business Foundation, Seoul (KR)

(72) Inventors: Seungin Baek, Yongin (KR); Hwi Kim, Seoul (KR); Dajeong Im, Seoul (KR); Sujin Choi, Seoul (KR)

(73) Assignees: Samsung Display Co., Ltd., Yongin-si (KR); KOREA UNIVERSITY Research and Business Foundation, Seoul (KR)

( * ) Notice: Subject to any disclaimer, the term of this patent is extended or adjusted under 35 U.S.C. 154(b) by 0 days.

(21) Appl. No.: 14/660,214

(22) Filed: Mar. 17, 2015

(65) Prior Publication Data

US 2016/0033691 A1 Feb. 4, 2016

(30) Foreign Application Priority Data

Aug. 1, 2014 (KR) .................. 10-2014-0099243

(51) Int. Cl.
*G02B 5/22* (2006.01)
*G02B 7/00* (2006.01)
*G02B 5/00* (2006.01)

(52) U.S. Cl.
CPC .................... *G02B 5/003* (2013.01)

(58) Field of Classification Search
CPC . G02B 5/201; G02B 5/22; G02B 5/20; G02B 7/006; G02B 5/003; G02F 1/133512; G02F 1/13394; G02F 2001/13396; G02F 1/133707; G02F 1/1339; G02F 1/1333
USPC .................................... 359/885, 892
See application file for complete search history.

(56) References Cited

U.S. PATENT DOCUMENTS

| 7,710,036 | B2 * | 5/2010 | Cha | H01J 11/12 313/110 |
| 7,880,854 | B2 * | 2/2011 | Kondo | G02F 1/1339 349/153 |
| 2004/0241517 | A1 * | 12/2004 | Shinozaki | G02F 1/1508 359/265 |
| 2005/0244609 | A1 * | 11/2005 | Arakawa | B32B 15/08 428/137 |

(Continued)

FOREIGN PATENT DOCUMENTS

| KR | 10-2009-0125416 | 12/2009 |
| KR | 10-2010-0067817 | 6/2010 |

(Continued)

*Primary Examiner* — Jade R Chwasz
(74) *Attorney, Agent, or Firm* — H.C. Park & Associates, PLC

(57) ABSTRACT

A broadband light absorber and a display apparatus including the same. The broadband light absorber includes a substrate and a pattern layer having a mesh structure including a plurality of openings, wherein any neighboring openings among the plurality of openings are non-uniform and wherein the plurality of openings comprise first openings having a first size and second openings having a second size different from the first size, the first openings and the second openings being alternately arranged in a first direction.

17 Claims, 10 Drawing Sheets

(56) References Cited

U.S. PATENT DOCUMENTS

| | | | |
|---|---|---|---|
| 2008/0018247 A1* | 1/2008 | Park | H01J 11/12 |
| | | | 313/582 |
| 2009/0295297 A1 | 12/2009 | Hwang et al. | |
| 2010/0149672 A1 | 6/2010 | Lee et al. | |
| 2013/0271834 A1 | 10/2013 | Kim et al. | |
| 2014/0029103 A1 | 1/2014 | Budleski | |

FOREIGN PATENT DOCUMENTS

| KR | 10-2010-0088759 | 8/2010 |
|---|---|---|
| KR | 10-2011-0060412 | 6/2011 |

* cited by examiner

BROADBAND LIGHT ABSORBER AND DISPLAY APPARATUS INCLUDING THE SAME

CROSS-REFERENCE TO RELATED APPLICATION

This application claims priority from and the benefit of Korean Patent Application No. 10-2014-0099243, filed on Aug. 1, 2014, which is incorporated by reference for all purposes as if fully set forth herein.

BACKGROUND

Field

Exemplary embodiments of the present invention relate to a broadband light absorber which may absorb light of various wavelength bands and a display apparatus including the same.

Discussion of the Background

Display apparatuses are used to provide users with visual information such as images and pictures. Display apparatuses are manufactured in various forms to present visual information such as images and pictures.

However, display apparatuses include many metal components, and thus external light is reflected by the metal components. Related display apparatuses use a polaroid or a retardation film to prevent the reflection of external light. However, the polaroid film or the retardation film has a problem that optical absorption varies depending on a wavelength or an incident angle of the external light.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention include a broadband light absorber which may absorb light of a wide wavelength band and a display apparatus including the same.

Exemplary embodiments of the present invention include a broadband light absorber which may absorb light of a wide wavelength band regardless of an incident angle of incident light and a display apparatus including the same.

Additional aspects will be set forth in part in the description which follows and, in part, will be apparent from the description, or may be learned by practice of the presented embodiments.

According to exemplary embodiments of the present invention, a broadband light absorber includes a substrate and a pattern layer having a mesh structure including a plurality of openings disposed on the substrate, wherein neighboring openings from among the plurality of openings are non-uniform.

According to exemplary embodiments of the present invention, a broadband light absorber includes a substrate and a plurality of first lines spaced apart on the substrate in a first direction, wherein pitches between the plurality of first lines are non-uniform.

According to one or more embodiments of the present invention, a display apparatus includes a display panel displaying pictures and the broadband light absorber disposed on at least one of an inside and a front side of the display panel, the broadband light absorber including a substrate and a pattern layer having a mesh structure including a plurality of openings disposed on the substrate, wherein neighboring openings from among the plurality of openings are non-uniform.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
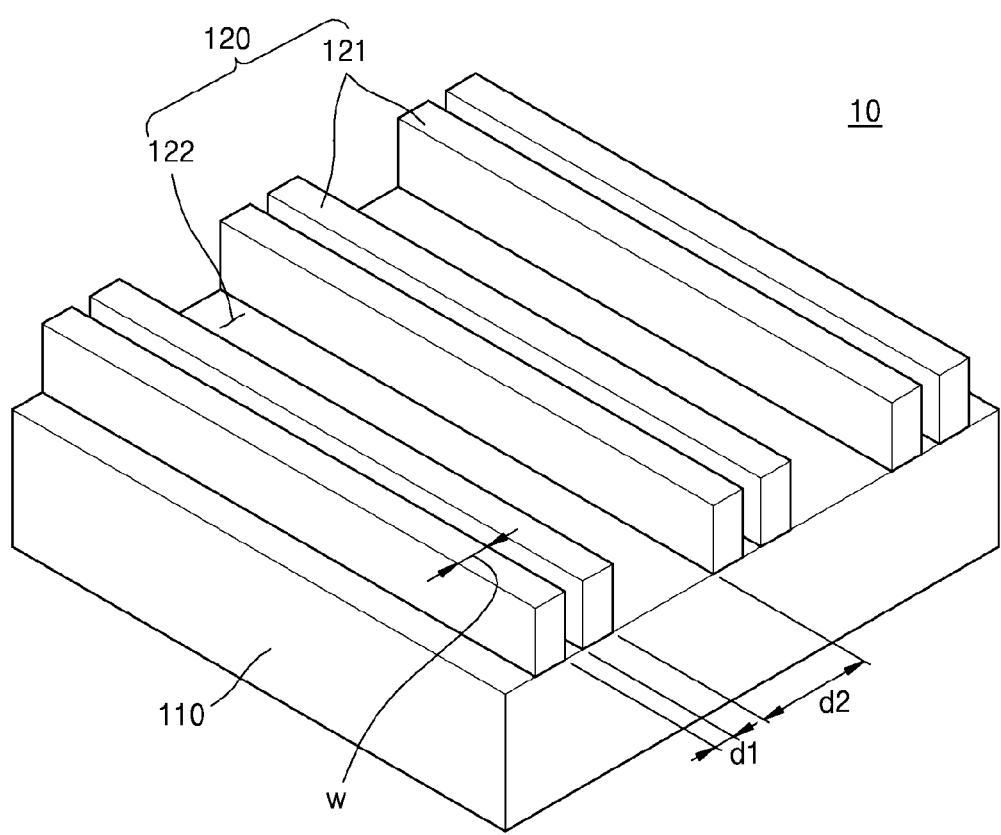
FIG. 1 is a perspective view illustrating a broadband light absorber according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a view illustrating a broadband light absorber0 according to an exemplary embodiment of the present invention. As shown in FIG. 1, the broadband light absorber 10 may include a substrate 110 and a plurality of lines 121 spaced apart on the substrate 110 in a first direction. The broadband light absorber 10 may absorb external light, for example, light of a visible ray band.

The substrate 110 may include at least one of copper (Cu), silver (Ag), aluminum (Al), nickel (Ni), gold (Au), and any combinations thereof.

The plurality of lines 121 and spaces 122 between the plurality of lines 121 may form a pattern layer 120. Distances between the plurality of lines 121 may be non-uniform. As shown in FIG. 1, a first distance d1 and a second distance d2 which are the distances between the lines 121 may be different from each other. In FIG. 1, the plurality of lines 121 are disposed on the substrate 110 alternately at the first and the second distances d1 and d2 in the first direction. However, aspects of the invention are not limited thereto. Some or all of the distances between the plurality of lines 121 may be different from each other, or at least two of the distances between the plurality of lines 121 may be different from each other.

While the distances between the plurality of lines 121 may be non-uniform, the maximum distance between the plurality of lines 121 may be equal to or less than twice the minimum distance between the plurality of lines 121. The distances between the plurality of lines 121 may be shorter than a wavelength of external light, more specifically, light to be absorbed by the broadband light absorber 10. If the distances between the plurality of lines 121 are longer than the wavelength of the external light, the light may not be absorbed but transmitted. For example, the distances between the plurality of lines 121 may range from about 50 nm to about to 300 nm. As described above, the distances between the plurality of lines 121 may be non-uniform, and thus, the broadband light absorber 10 may absorb light having a broad spectrum of wavelengths.

At least two of the plurality of lines 121 may be formed with the same substance, or at least two of the plurality of lines 121 may be formed with a different substance from each other. The lines 121 may be formed with a substance with a refractive index, which may range, for example, from about 2 to about 5, to facilitate optical absorption. Also, the plurality of lines 121 may be formed with a substance with an extinction coefficient, which may range, for example, from about 0 to about 5. For example, the plurality of lines 121 may be formed with germanium (Ge) or a substance which has a similar property value to germanium (Ge).

While optical absorption may be higher when the widths of the lines 121 are longer, one or more of the widths of the plurality of lines 121 may be shorter than the wavelength of light to be absorbed by the broadband light absorber 10. One or more of the widths of the plurality of lines 121 may be in nano sizes, for example, sizes ranging from about 50 nm to about 300 nm.

Figure 2:
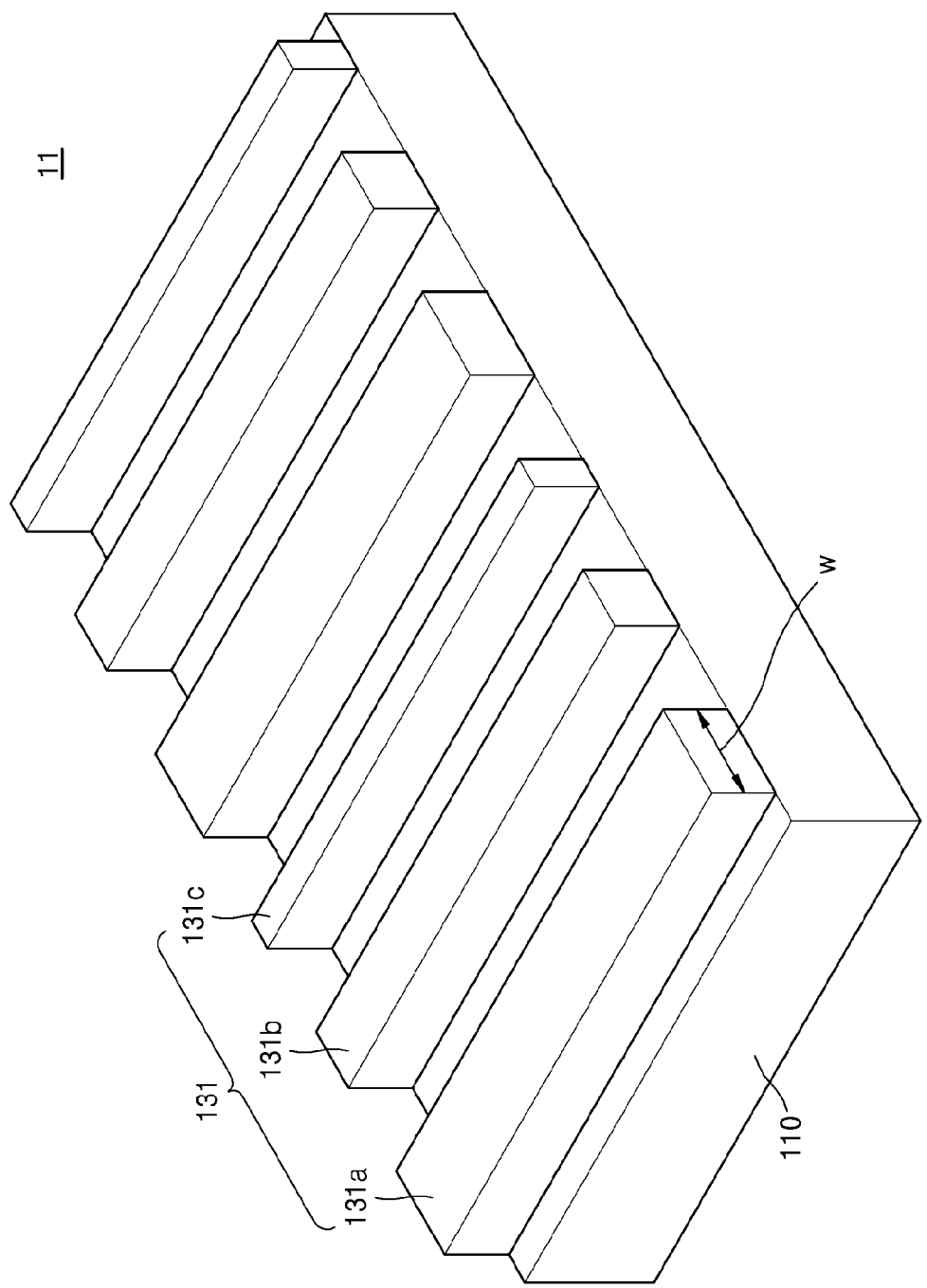
FIGS. 2 and 3 are perspective views illustrating broadband light absorbers according to exemplary embodiments of the present invention.
Figure 3:
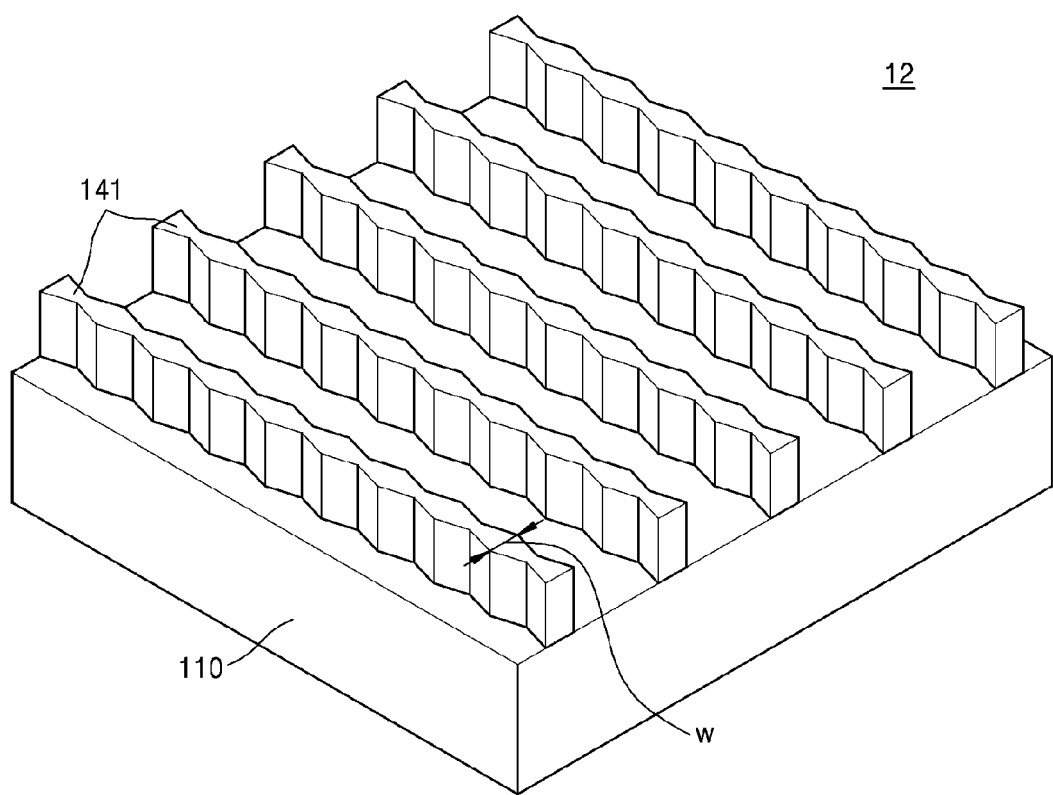

FIGS. 2 and 3 are views illustrating broadband light absorbers according to exemplary embodiments of the present invention. As shown in FIGS. 2 and 3, the broadband light absorber 11 or 12 may have lines 131 or 141 with non-uniform widths, to absorb light with a broad spectrum of wavelength. More specifically, referring to FIG. 2, the widths W of line 131$a$, 131$b$, and 131$c$ may be different. Referring to FIG. 3, the widths W may also be non-uniform along the same line 141. More specifically, one portion of line 141 may have a width that is larger or smaller than another portion of the same line 141. The widths of line 141 may be shorter than a wavelength of light to be absorbed. Also, the maximum width of the lines 131 or 141 may be equal to or less than twice the minimum width of the lines 131 or 141.

To support absorption of light by a non-uniform pattern, the lines 121 may, for example, include germanium (Ge), which may be disposed in one-dimension or direction on the substrate 110. The substrate may include gold (Au) having a thickness, for example, 20 nm. For example, the lines 121 may be 420 nm thick and 140 nm wide, and may be disposed at alternating distances where d1 is 95 nm and d2 is 245 nm.

Figure 4A:
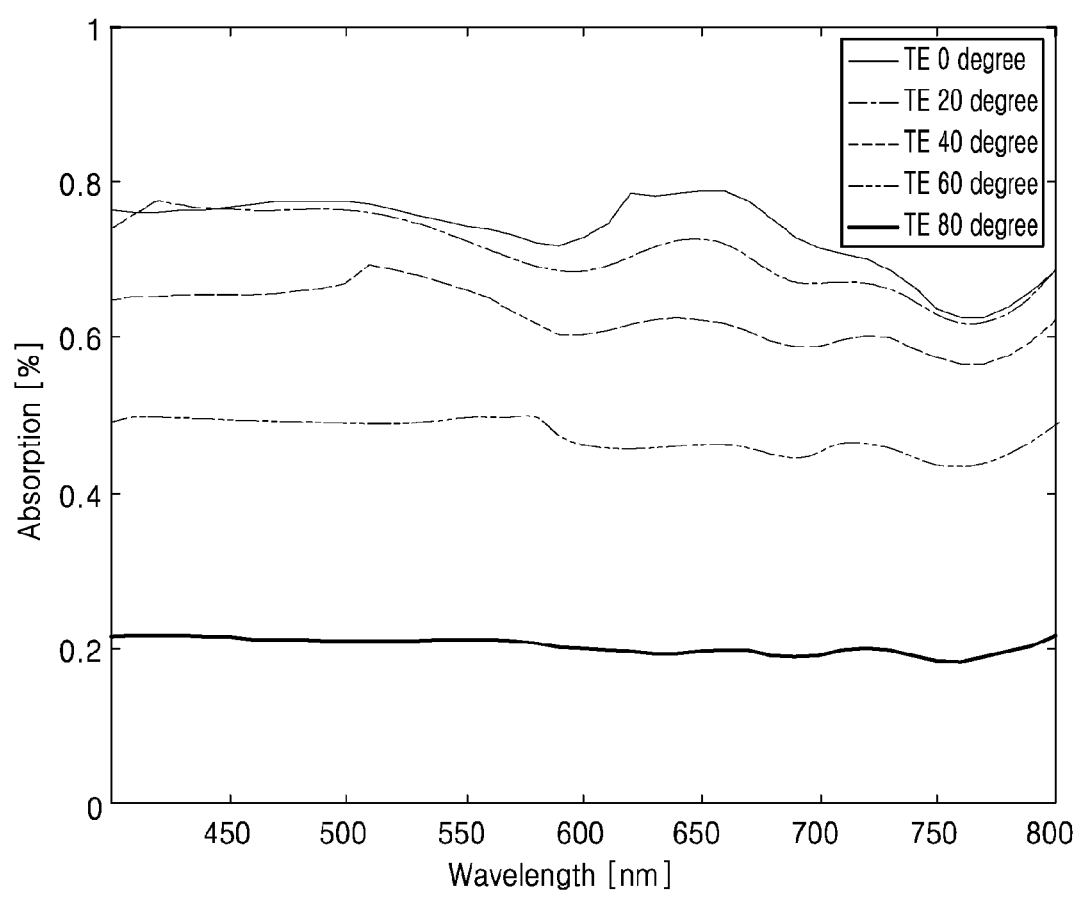
FIG. 4A is a graph showing absorption of incident light in transverse electric (TE) mode.
Figure 4B:
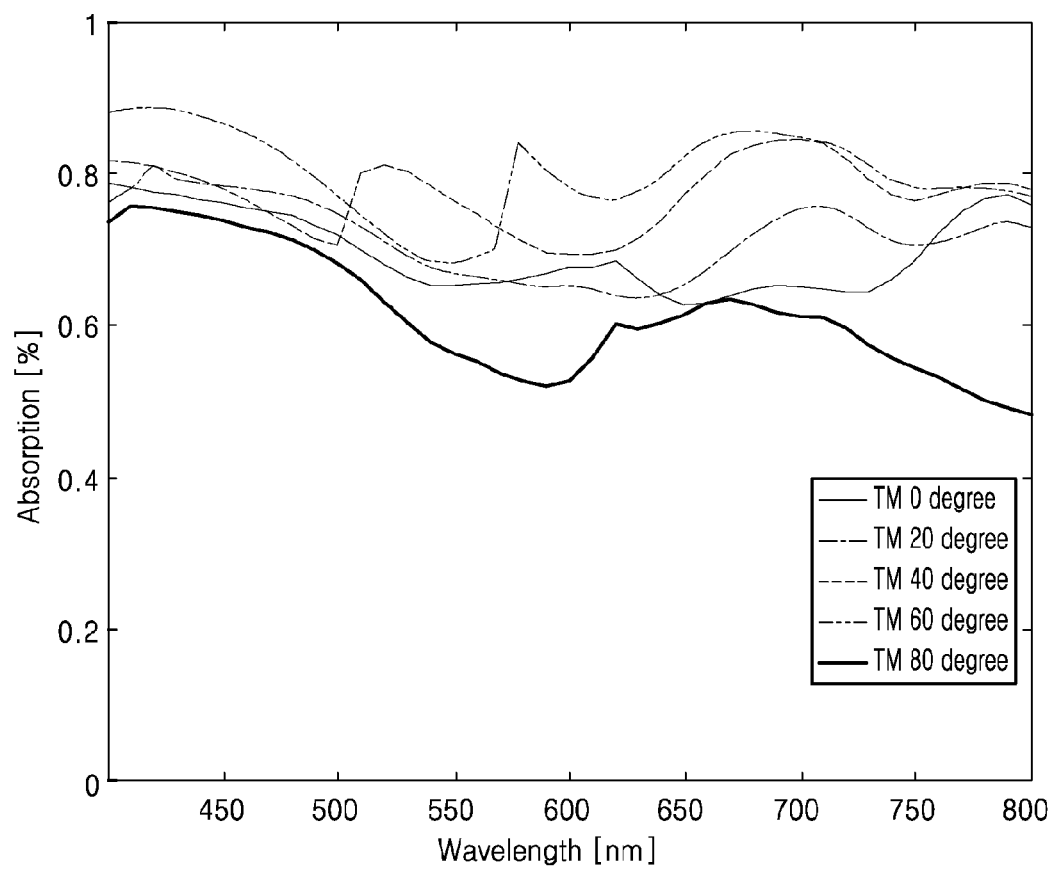
FIG. 4B is a graph showing absorption of incident light in transverse magnetic (TM) mode.

FIG. 4A is a graph showing absorption of incident light in a transverse electric (TE) mode, and FIG. 4B is a graph showing absorption of incident light in a transverse magnetic (TM) mode. As shown in FIGS. 4A and 4B, 70% or greater percentage of light in the TE mode at an incident angle ranging from 0 degree to 60 degrees may be absorbed. The light in a relatively broad wavelength spectrum from about 450 nm to about 800 nm may be absorbed.

Figure 5:
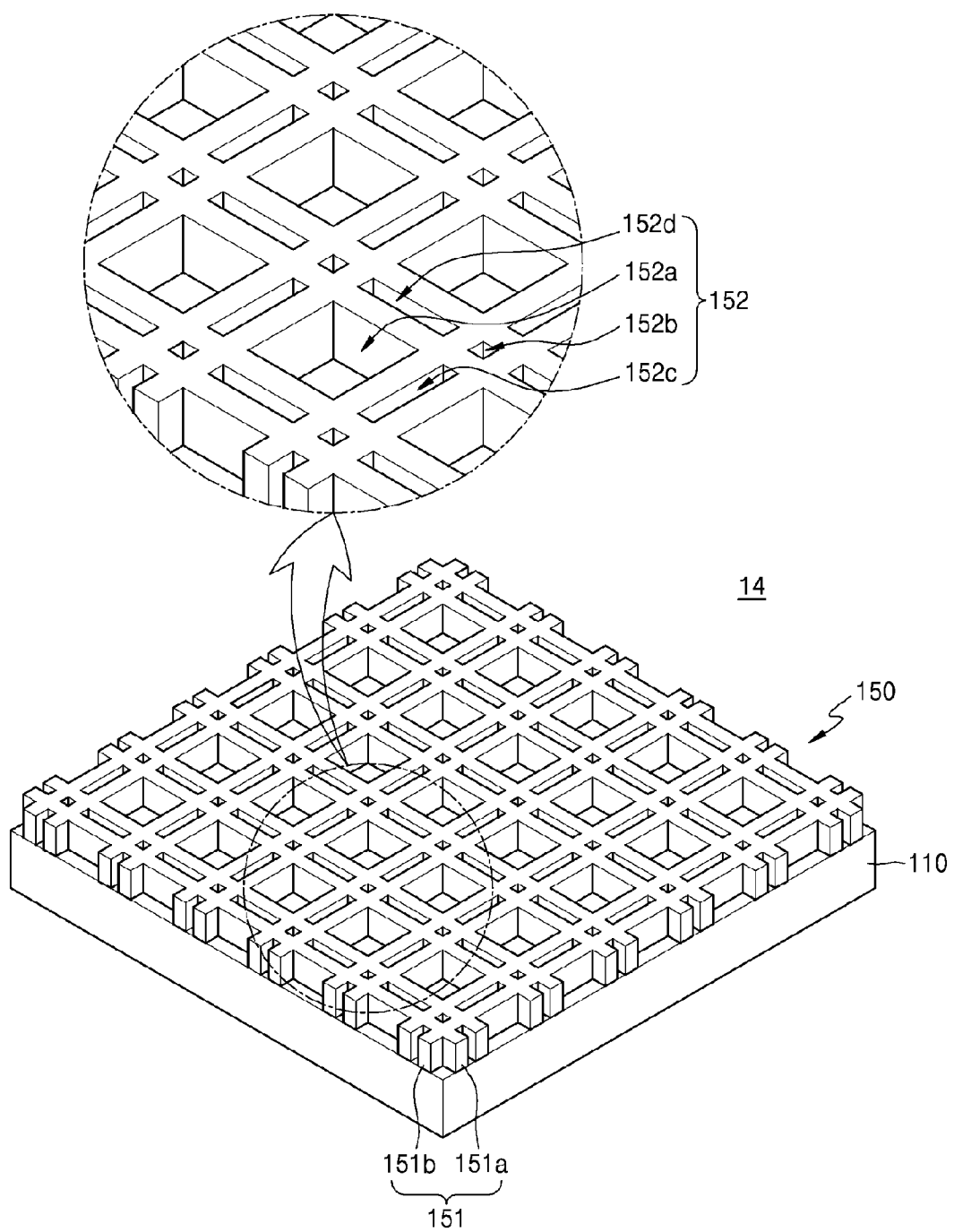
FIG. 5 is a perspective view illustrating a broadband light absorber according to an exemplary embodiment of the present invention.

Also, according to an exemplary embodiment of the present invention, a broadband light absorber may include a plurality of lines arranged in two-dimensions. FIG. 5 is a view illustrating a broadband light absorber 14 according to an exemplary embodiment of the present invention. As shown in FIG. 5, the broadband light absorber 14 may include a substrate 110, and a pattern layer 150 of a mesh structure including a plurality of openings 152.

The substrate 110 is the same as what has been previously described, and therefore a description thereof will be omitted.

The pattern layer 150 may be of a mesh structure including the plurality of openings 152. Sizes of the plurality of openings 152 may be non-uniform. Appearances of the neighboring openings 152 among the plurality of openings 152 may be non-uniform. Further, sizes and/or shapes of the neighboring openings 152a, 152b, 152c, and 152d may be different from each other, as shown in FIG. 5. As illustrated in FIG. 5, the plurality of openings 152 may be in quadrangular shapes. However, the plurality of openings 152 may be different sized quadrangles, which may include, a combination of a larger square 152a, a smaller square 152b, and rectangles 152c and 152d. The above structure may eliminate a direction with respect to an angle of incident light. While FIG. 5 illustrates that the shapes of the openings 152 are quadrangles, aspects f the invention are not limited thereto, such that shapes of the openings 152 may be polygons of various forms or oval.

While the sizes of the plurality of openings 152 may be non-uniform, the maximum width may be equal to or less than twice the minimum width, among widths of the plurality of openings 152. The widths of the plurality of openings 152 may be shorter than a wavelength of external light. Because if the widths of the plurality of openings 152 are longer than the wavelength of the external light, the light may not be absorbed but transmitted. For example, the widths of the plurality of openings 152 range from about 50 nm to about 300 nm. As described above, the sizes of the plurality of openings 152 are non-uniform, and thus, dependency of the broadband light absorber 14 on an angle with respect to the external light may be reduced or removed. Concerning the substrate 110, an area covered by the plurality of openings 152 may be 50% or higher percentage of the entire area of the substrate 110.

In order to form the plurality of openings 152, the pattern layer 150 may include a plurality of first lines 151a spaced apart in a first direction, and a plurality of second lines 151b spaced apart in a second direction which crosses the first direction. The plurality of second lines 151b may overlap with or extend through the plurality of first lines 151a. To form the plurality of openings 152 which are non-uniform, the distances between the plurality of first lines 151a and the distances between the plurality of second lines 151b may be non-uniform. In FIG. 5, the openings 152 are formed non-uniformly by disposing the plurality of first lines 151a at alternating distances of a first length and a second length, and disposing the plurality of second lines 151b similarly at alternating distances. However, aspects of the invention are not limited thereto. For example, the distances between the first lines 151a may all be different, or at least two selected distances between the first lines 151a may be non-uniform.

The first lines 151a and the second lines 151b may be formed with the same substance or a different substance from each other. The first lines 151a and the second lines 151b may be formed with a substance with a refractive index—which may range, for example, from about 2 to about 5, to facilitate optical absorption. Also, the first lines 151a and the second lines 151b may be formed with a substance with an extinction coefficient which may range, for example, from about 0 to about 5. For example, the first lines 151a and the second lines 151b may be formed with germanium (Ge) or a substance which has a similar property value to germanium (Ge).

While optical absorption may be higher as the widths of the first lines 151a and the second lines 151b are longer, one or more of the widths of the first lines 151a and the second lines 151b may be shorter than the wavelength of the external light, more specifically, the light to be absorbed by the broadband light absorber. One or more of the widths of the first lines 151a and the second lines 151b may be in nano sizes, for example, which may range from about 50 nm to about 300 nm.

Figure 6:
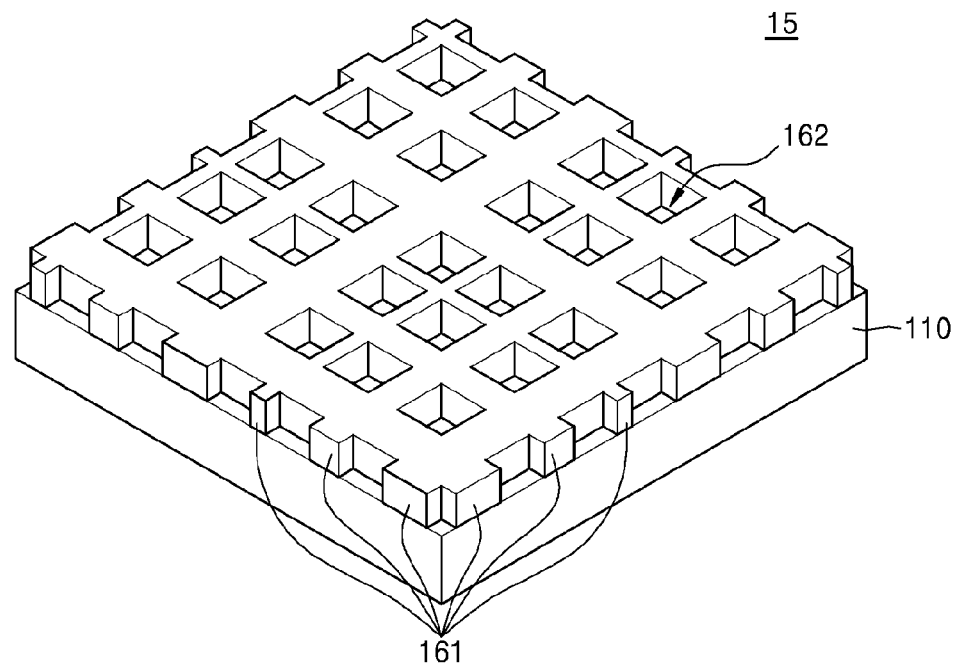
FIGS. 6 and 7 are perspective views illustrating broadband light absorbers according to exemplary embodiments of the present invention.
Figure 7:
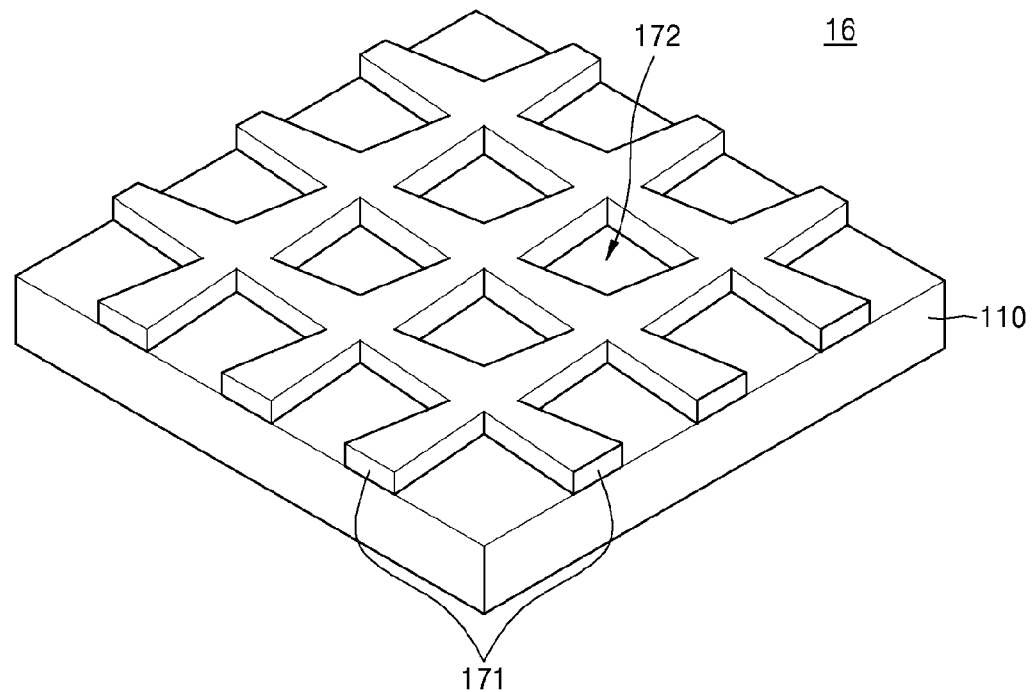

FIGS. 6 and 7 are views illustrating broadband light absorbers 15 and 16 according to exemplary embodiments of the present invention. As shown in FIGS. 6 and 7, the broadband light absorbers 15 and 16 may have non-uniform widths of lines 161 and 171. More specifically, as shown in FIG. 6, the widths may be different per the line 161. As shown in FIG. 7, the widths may be different even within the same line 171. Further, the widths may be shorter than a wavelength of external light, more specifically, the light to be absorbed by the broadband light absorber 15 and 16. Also, the maximum width may be equal to or less then twice the minimum width. In addition, dependence of the light on an angle may be reduced or removed by the non-uniformity in the widths of the lines 161 and 171. As described above, the widths of the lines 161 and 171 may be non-uniform, and thus, the openings 162 and 172 may be asymmetric. In FIG. 7, the openings 172 are quadrangles in which neighboring included angles are non-uniform. However, aspects of the invention are not limited thereto, such that the openings 172 may be of oval shapes or other forms of polygons, for example, triangles, pentagons, and the like, in which the widths are non-uniform.

In order to make sure that optical absorption has been improved by non-uniformity of openings, lines 151 may include, for example, germanium (Ge) an be arranged in two-dimensions on a substrate, which may, for example, include gold (Au) and have a thickness of 20 nm. Further, in an example, the lines 151 may be 420 nm thick and 140 nm wide, and may be arranged the distances between the lines 151 alternate between 95 nm and 245 nm.

Figure 8A:
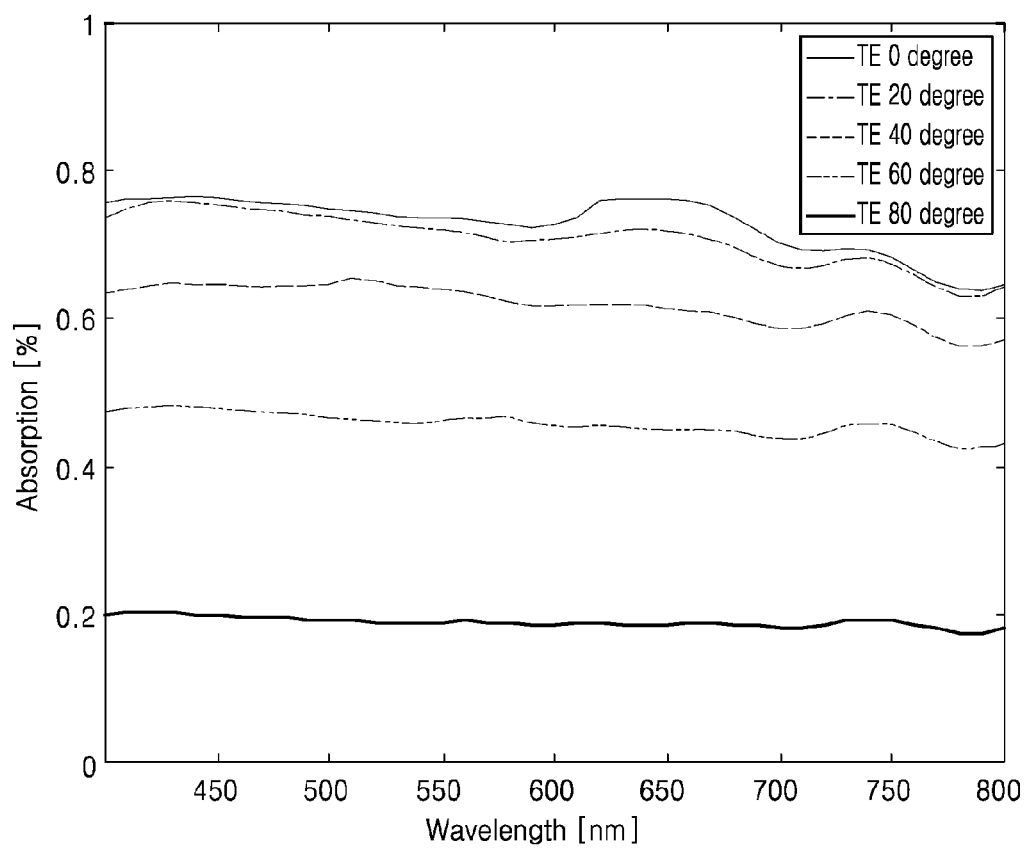
FIG. 8A is a graph showing absorption of incident light from external light in TE mode.
Figure 8B:
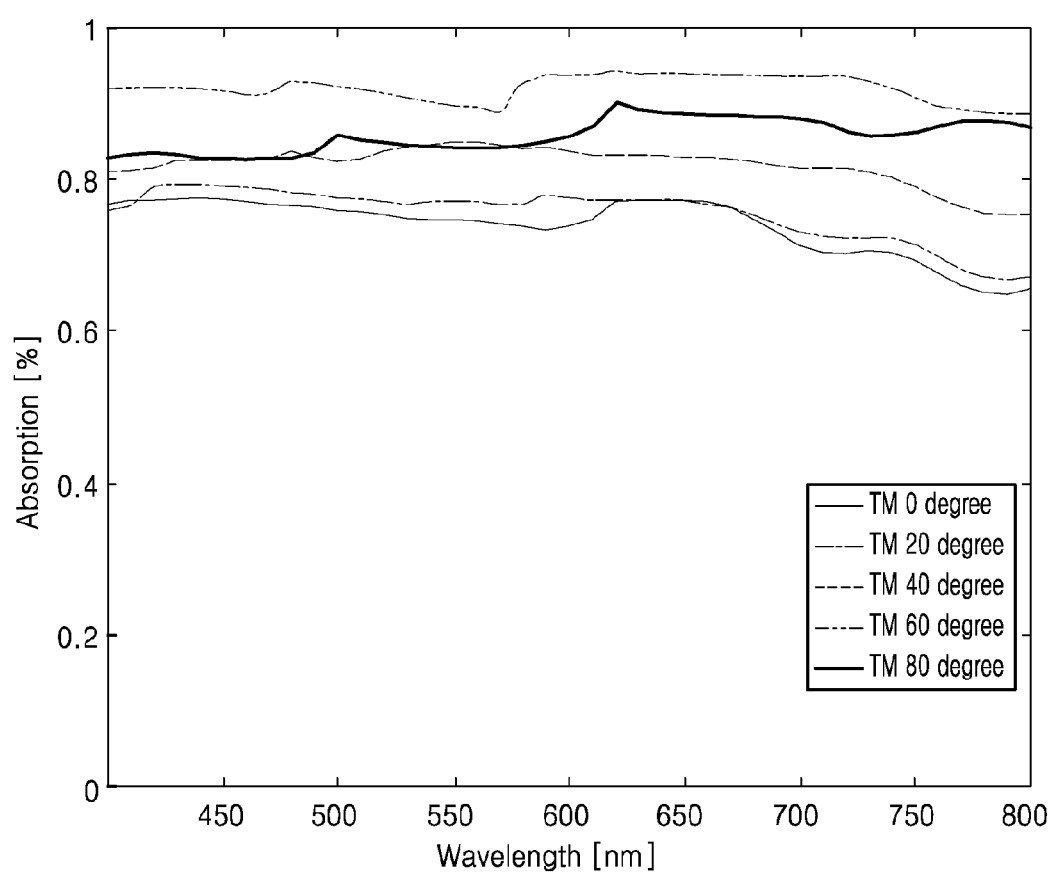
FIG. 8B is a graph showing absorption of incident light from external light in TM mode.

FIG. 8A is a graph showing absorption of incident light from external light in TE mode, and FIG. 8B is a graph showing absorption of incident light from external light in TM mode. As shown in FIGS. 8A and 8B, 70% or greater percentage of light in the TE mode at an incident angle ranging from of 0 degree to 60 degrees may be absorbed. Also, the light in the TE mode may be absorbed by 80% or greater percentage in the entire range of the incident angle, more particularly by 90% or greater percentage in the range where the incident angle is 60 degrees or greater. The absorption of the light in the TM mode may be high in the range where the absorption of the light in the TE mode may be low, which may indicate that the TE and TM mode have complementary relationship.

The above broadband light absorber 10, 11, 12, 14, 15, or 16 may be a component of the display apparatus, which may absorb external light. The display apparatus may be disposed on at least one of a display panel displaying pictures, an inside of the display panel, and a front side of the display panel, and may include the above broadband light absorber 10, 11, 12, 14, 15, or 16.

Figure 9:
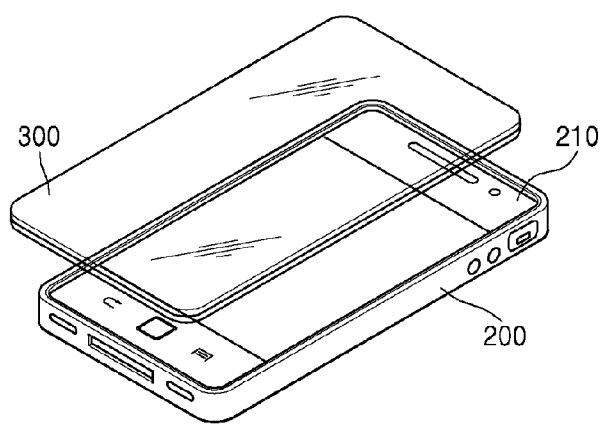
FIG. 9 is a perspective view illustrating a display apparatus according to an exemplary embodiment of the present invention.

FIG. 9 is a view illustrating a display apparatus according to an exemplary embodiment of the present invention. As shown in FIG. 9, a broadband light absorber 300 may be attached on a front side 210 of a display panel 200. The broadband light absorber 300 may be one of the above mentioned broadband light absorber 10, 11, 12, 14, 15, or 16, and may be attached on the front side 210 of the display panel 200 by an adhesive (not shown).

Figure 10:
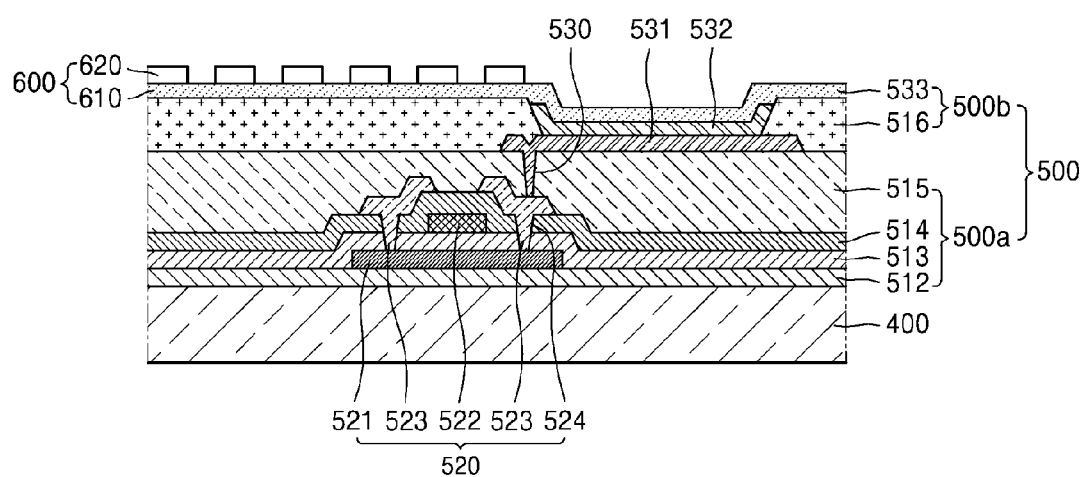
FIG. 10 is a cross-sectional view illustrating a portion of a display apparatus according to an exemplary embodiment of the present invention.

FIG. 10 is a view illustrating a portion of a display apparatus according to an exemplary embodiment of the present invention. As shown in FIG. 10, a broadband light absorber 600 may be disposed on an inside of the display apparatus. The display apparatus may include a substrate 400, a display unit 500 disposed on the substrate 400, and the broadband light absorber 600 disposed on the display unit 500.

The substrate 400 may be a flexible substrate and may include plastic with high thermal resistance and durability such as polyimide, polyethylene terephthalate (PET), polycarbonate, polyethylene naphtalate, polyarylate (PAR), polyetherimide, and the like. However, aspects of the invention are not limited thereto, and the substrate 400 may include various materials such as metal and glass.

The display unit 500 may have an organic thin film transistor (TFT) layer 500a and a pixel portion 500b. The pixel portion 500b may be an organic light emitting device.

A buffer layer 512 may be disposed on the substrate 400. The buffer layer 512, which may prevent or impede penetration of an impure element through the substrate 400 and provides a flat surface to an upper portion of the substrate 400, may be formed with various materials which may perform such a role.

For example, the buffer layer 512 may contain inorganic compounds such as silicon oxide, silicon nitride, silicon oxynitride, aluminium oxide, aluminium nitride, titanium oxide, and titanium nitride, or organic compounds such as polyimide, polyester, and acryl. The buffer layer 512 may be formed with a plurality of stacks of the recited materials.

The TFT layer 500a may be disposed on the buffer layer 512. While FIG. 10 illustrates a top gate type TFT as an example of the TFT layer 500a, a TFT of a different structure may be included.

The TFT layer 500a may include an active layer 521, a gate electrode 522, and a source and a drain electrode 523.

The active layer 521 is disposed on the buffer layer 512 in a semiconductor material, and a gate insulating film 513 is disposed thereon to cover the buffer layer 512 and the active layer 521. An inorganic semiconductor such as amorphous silicon and polysilicon or an organic semiconductor may be used for the active layer 521. The active layer 521 has a source region, a drain region, and a channel region between the source region and the drain region. The gate insulating film 513, which may insulate the active layer 521 and the gate electrode 522, may be formed with organic compounds or inorganic compounds such as SiNx and $SiO_2$.

The gate electrode 522 is disposed on the gate insulating film 513, and an interlayer insulating film 514 is disposed thereon to cover the gate insulating film 513 and the gate electrode 522.

While the gate electrode 522 may contain Au, Ag, Cu, Ni, Pt, Pd, Al, and Mo and may include an alloy such as Al:Nd alloy and Mo:W alloy, the gate electrode 522 is not limited thereto, and may be formed with various materials in view of design conditions.

The interlayer insulating film 514, which is disposed between the gate electrode 522 and the source and the drain electrode 523, to insulate the gate electrode 522 and the source and the drain electrode 523, may be formed with inorganic compounds such as SiNx and $SiO_2$.

The source and the drain electrode 523 are disposed on the interlayer insulating film 514. More specifically, the interlayer insulating film 514 and the gate insulating film 513 are disposed to expose the source region and the drain region of the active layer 521, and the source and the drain electrode 523 are disposed to be in contact with the source region and the drain region of the active layer 521.

While FIG. 10 illustrates a top gate type TFT sequentially including the active layer 521, the gate electrode 522, and the source and the drain electrode 523, aspects of the embodiment are not limited thereto, and the gate electrode 522 may be disposed on a lower portion of the active layer 521.

The TFT layer 500a is electrically connected with the pixel portion 500b to drive the pixel portion 500b, and is protected by being covered with a planarization film 515.

For the planarization film 515, an inorganic insulating film and/or an organic insulating film may be used. The inorganic insulating film may include $SiO_2$, SiNx, SiON, $Al_2O_3$, $TiO_2$, $Ta_2O_5$, $HfO_2$, $ZrO_2$, BST, and PZT, and the organic insulating film may include a general-purpose polymer (PMMA, PS), a polymer derivative having a phenol-based group, an acryl-based polymer, an imide-based polymer, an aryl ether-based polymer, an amide-based polymer, a fluorine-based polymer, a p-xylene based polymer, a vinyl alcohol-based polymer, and blends thereof. Also, the planarization film 515 may be formed with a composite stack of the inorganic insulating film and the organic insulating film.

The pixel portion 500b is disposed on the planarization film 515 and may include a pixel electrode 531, an intermediate layer 532, and a counter electrode 533.

The pixel electrode 531 is disposed on the planarization film 515 and electrically connected with the source and the drain electrode 523 through a contact hole 530 formed in the planarization film 515.

The pixel electrode 531 may be a reflective electrode and may have a reflective film formed with Ag, Mg, Al, Pt, Pd, Au, Ni, Nd, Ir, Cr, and compounds thereof, and a transparent or translucent electrode layer disposed on the reflective film. The transparent or translucent electrode layer may include at least one selected from the group including indium tin oxide (ITO), indium zinc oxide (IZO), zinc oxide (ZnO), indium oxide ($In_2O_3$), indium gallium oxide (IGO), and aluminum zinc oxide (AZO).

The counter electrode 533 which are disposed to be faced with the pixel electrode 531 may be a transparent or translucent electrode and may be formed with a metal thin film which has a low work function including Li, Ca, LiF/Ca, LiF/Al, Al, Ag, Mg, and compounds thereof. Also, an auxiliary electrode layer or a bus electrode may be further disposed on the metal thin film in a material to form the transparent electrode such as ITO, IZO, ZnO and $In_2O_3$.

Accordingly, the counter electrode 533 may transmit light emitted from an organic emission layer included in the intermediate layer 532. More specifically, the light emitted from the organic emission layer may be reflected by the pixel electrode 531 including a direct or reflective electrode, and thus, emitted toward the counter electrode 533.

However, the organic light emitting display apparatus 500 is not limited to a top-emitting type, and may be a bottom-emitting type where the light emitted from the organic emission layer is emitted toward the substrate 400. In this case, the pixel electrode 531 includes the transparent or translucent electrode, and the counter electrode 533 may include the reflective electrode. Also, the organic light emitting display apparatus may be a dual-emitting type, which may emit the light toward the top and the bottom in both directions.

A pixel-defining layer 516 is disposed on the pixel electrode 531 as an insulating material. The pixel-defining layer 516 exposes a predetermined region of the pixel electrode 531, and the intermediate layer 532 including the organic emission layer is located on the exposed region.

The organic emission layer may be of a low molecular weight organic compound or a polymer organic compound, and the intermediate layer 232 may further include a functional layer selectively such as a hole transport layer (HTL), a hole injection layer (HIL), an electron transport layer (ETL), and an electron injection layer (EIL) besides the organic emission layer.

The pattern layer 620 of the broadband light absorber 600 may be disposed on the counter electrode 533. The counter electrode 533 may be the substrate 610 of the broadband light absorber 600, and the pattern layer 620 may be disposed on the counter electrode 533. The pattern layer 620 may be a one-dimensional pattern or a two-dimensional patter. The pattern layer 620 may absorb not only external light but also light emitted from the intermediate layer 532. Accordingly, the pattern layer 620 may be disposed not over the entire counter electrode 533 but over portions of the counter electrode 533 not overlapping the intermediate layer 532.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A broadband light absorber comprising:
   a substrate; and
   a pattern layer having a mesh structure comprising a plurality of openings disposed on the substrate,
   wherein neighboring openings from among the plurality of openings are non-uniform,
   wherein the plurality of openings comprise first openings having a first size and second openings having a second size different from the first size, the first openings and the second openings being alternately arranged in a first direction, and
   wherein the pattern layer comprises:
   a plurality of first lines that are parallel to one another and are alternately spaced apart at a first distance and a second distance different from the first distance in the first direction,
   a plurality of second lines, overlapping the plurality of first lines, that are parallel to one another and are spaced apart in a second direction crossing the first direction, and
   wherein the plurality of first lines and the plurality of second lines are arranged on a same plane.

2. The broadband light absorber of claim 1, wherein sizes of neighboring openings from among the plurality of openings are non-uniform.

3. The broadband light absorber of claim 1, wherein shapes of neighboring openings from among the plurality of openings are non-uniform.

4. The broadband light absorber of claim 1, wherein at least one of the plurality of openings is configured in an asymmetrical shape.

5. The broadband light absorber of claim 1, wherein at least one of the plurality of openings has a quadrangular shape with non-uniform angles.

6. The broadband light absorber of claim 1, wherein at least one of the plurality of openings has an oval shape.

7. The broadband light absorber of claim 1, wherein the area occupied by the plurality of openings is equal to or greater than 50% of the entire area of the substrate.

8. The broadband light absorber of claim 1, wherein a width of one of the openings is smaller than a wavelength of light to be absorbed by the broadband light absorber.

9. The broadband light absorber of claim 1, wherein distances between the plurality of first lines and distances between the plurality of second lines are non-uniform.

10. The broadband light absorber of claim 1, wherein widths of the plurality of the first lines and widths of the plurality of the second lines are non-uniform.

11. The broadband light absorber of claim 1, wherein at least one of the first and the second lines has a widths equal to or less than twice the minimum width.

12. The broadband light absorber of claim 1, wherein a width of at least one of the first and the second lines is smaller than a wavelength of light to be absorbed by the broadband light absorber.

13. The broadband light absorber of claim 1, wherein a refractive index of at least one of the first and the second lines ranges from 2 to 5.

14. The broadband light absorber of claim 1, wherein an extinction coefficient of at least one of the first and the second lines ranges from 0 to 5.

15. A display apparatus comprising:
   a display panel; and
   a broadband light absorber disposed on at least one of an inside and a front side of the display panel, the broadband light absorber comprising:
   a substrate; and
   a pattern layer having a mesh structure comprising a plurality of openings disposed on the substrate,
   wherein neighboring openings from among the plurality of openings are non-uniform,
   wherein the plurality of openings comprise first openings having a first size and second openings having a second size different from the first size, the first openings and the second openings being alternately arranged in a first direction, and
   wherein the pattern layer comprises:
   a plurality of first lines that are parallel to one another and are alternately spaced apart at a first distance and a second distance different from the first distance in the first direction, and a plurality of second lines, overlapping the plurality of first lines, that are spaced apart in a second direction crossing the first direction.

16. The display apparatus of claim 15, wherein the display panel comprises an electrode, the electrode being the substrate.

17. The display apparatus of claim 15, wherein a light emitting portion of the display panel does not overlap with the pattern layer of the broadband light absorber.

* * * * *